United States Patent
Fripp et al.

(10) Patent No.: US 11,041,361 B2
(45) Date of Patent: Jun. 22, 2021

(54) DENSITY AICD USING A VALVE

(71) Applicant: Halliburton Energy Services, Inc., Houston, TX (US)

(72) Inventors: Michael Linley Fripp, Carrollton, TX (US); Stephen Michael Greci, Little Elm, TX (US); Ibrahim El Mallawany, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/610,077

(22) PCT Filed: Dec. 5, 2018

(86) PCT No.: PCT/US2018/064082
§ 371 (c)(1),
(2) Date: Oct. 31, 2019

(87) PCT Pub. No.: WO2020/117230
PCT Pub. Date: Jun. 11, 2020

(65) Prior Publication Data
US 2021/0062615 A1    Mar. 4, 2021

(51) Int. Cl.
*E21B 34/08* (2006.01)
*E21B 43/12* (2006.01)
(Continued)

(52) U.S. Cl.
CPC .............. *E21B 34/08* (2013.01); *F16K 31/18* (2013.01); *E21B 43/08* (2013.01); *E21B 43/12* (2013.01); *E21B 2200/02* (2020.05)

(58) Field of Classification Search
CPC .......... E21B 34/08; E21B 43/12; F16K 31/18
See application file for complete search history.

(56) References Cited

U.S. PATENT DOCUMENTS 8,584,762 B2 * 11/2013 Fripp ...................... E21B 34/08
166/373
9,453,395 B2 * 9/2016 Fripp ...................... E21B 43/12
(Continued)

OTHER PUBLICATIONS

ISRWO International Search Report and Written Opinion for PCT/US2018/064082 dated Sep. 4, 2019.

*Primary Examiner* — Matthew R Buck
(74) *Attorney, Agent, or Firm* — Scott Richardson; C. Tumey Law Group PLLC (57) ABSTRACT

A flow system, comprising: a flow control device, wherein a portion of the flow control device is disposed within a fluid pathway, wherein the flow control device is configured to rotate, wherein the flow control device comprises floats, wherein the floats block a potential flow path for fluids to travel through an outlet of the flow control device; a regulatory valve, wherein the regulatory valve is configured to receive a remaining portion of fluids from the fluid pathway; a control line, wherein the control line couples the outlet of the flow control device to the regulatory valve; an offset line, wherein the offset line provides fluid communication between fluids that travel past the flow control device and the regulatory valve; and a fluid restrictor, wherein the fluid restrictor is disposed within the fluid pathway upstream from the flow control device, wherein the fluid restrictor is configured to reduce fluid pressure.

20 Claims, 6 Drawing Sheets

(51) Int. Cl.
*F16K 31/18* (2006.01)
*E21B 43/08* (2006.01)

(56) References Cited

U.S. PATENT DOCUMENTS

| | | | |
|---|---|---|---|
| 9,534,470 | B2 | 1/2017 | Aakre et al. |
| 9,556,706 | B1 * | 1/2017 | Zhao ........................ E21B 43/08 |
| 9,841,120 | B2 * | 12/2017 | Nicholson .................. F16K 1/22 |
| 10,060,221 | B1 | 8/2018 | Rong et al. |
| 10,704,359 | B2 | 7/2020 | Fripp et al. |
| 2006/0076150 | A1 | 4/2006 | Coronado et al. |
| 2013/0092393 | A1 | 4/2013 | Dykstra et al. |
| 2013/0220633 | A1 * | 8/2013 | Felten ...................... E21B 43/12 |
| | | | 166/373 |
| 2014/0041731 | A1 | 2/2014 | Fripp et al. |
| 2015/0060084 | A1 * | 3/2015 | Moen ...................... E21B 43/12 |
| | | | 166/373 |
| 2016/0061004 | A1 * | 3/2016 | Tunkiel ................... E21B 43/12 |
| | | | 166/373 |
| 2020/0291745 | A1 | 9/2020 | Greci et al. |
| 2020/0308927 | A1 | 10/2020 | Fripp et al. |

* cited by examiner

DENSITY AICD USING A VALVE

BACKGROUND

In hydrocarbon production wells, it may be beneficial to regulate the flow of formation fluids from a subterranean formation into a wellbore penetrating the same. A variety of reasons or purposes may necessitate such regulation including, for example, prevention of water and/or gas coning, minimizing water and/or gas production, minimizing sand production, maximizing oil production, balancing production from various subterranean zones, equalizing pressure among various subterranean zones, and/or the like.

A number of devices are available for regulating the flow of formation fluids. Some of these devices may be non-discriminating for different types of formation fluids and may simply function as a "gatekeeper" for regulating access to the interior of a wellbore pipe, such as a well string. Such gatekeeper devices may be simple on/off valves or they may be metered to regulate fluid flow over a continuum of flow rates. Other types of devices for regulating the flow of formation fluids may achieve at least some degree of discrimination between different types of formation fluids. Such devices may include, for example, tubular flow restrictors, nozzle-type flow restrictors, autonomous inflow control devices, non-autonomous inflow control devices, ports, tortuous paths, combinations thereof, and the like.

Autonomous flow control devices may be particularly advantageous in subterranean operations, since they are able to automatically regulate fluid flow without the need for operator control due to their design. In this regard, autonomous flow control devices may be designed such that they provide a greater resistance to the flow of undesired fluids (e.g., gas and/or water) than they do desired fluids (e.g., oil), particularly as the percentage of the undesired fluids increases.

While autonomous flow control devices may operate in a passive fashion, it may be desirable to limit the flow of an undesired fluid into the interior of a production tubing string. For example, oftentimes, the ratio of oil-to-water in a stimulated fluid may be less than optimal.

BRIEF DESCRIPTION OF THE DRAWINGS

These drawings illustrate certain aspects of some examples of the present disclosure, and should not be used to limit or define the disclosure.

DETAILED DESCRIPTION

Provided are systems and methods for controlling the fluid flow into an interior of a production tubing string from the surrounding formations. As discussed below, design features may include the addition of a suitable valve between the autonomous flow control device and the production tubing string. In examples, the valve may selectively restrict any fluid flow through the outlet flow ports of the autonomous flow control device into the production tubing string.

Figure 1:
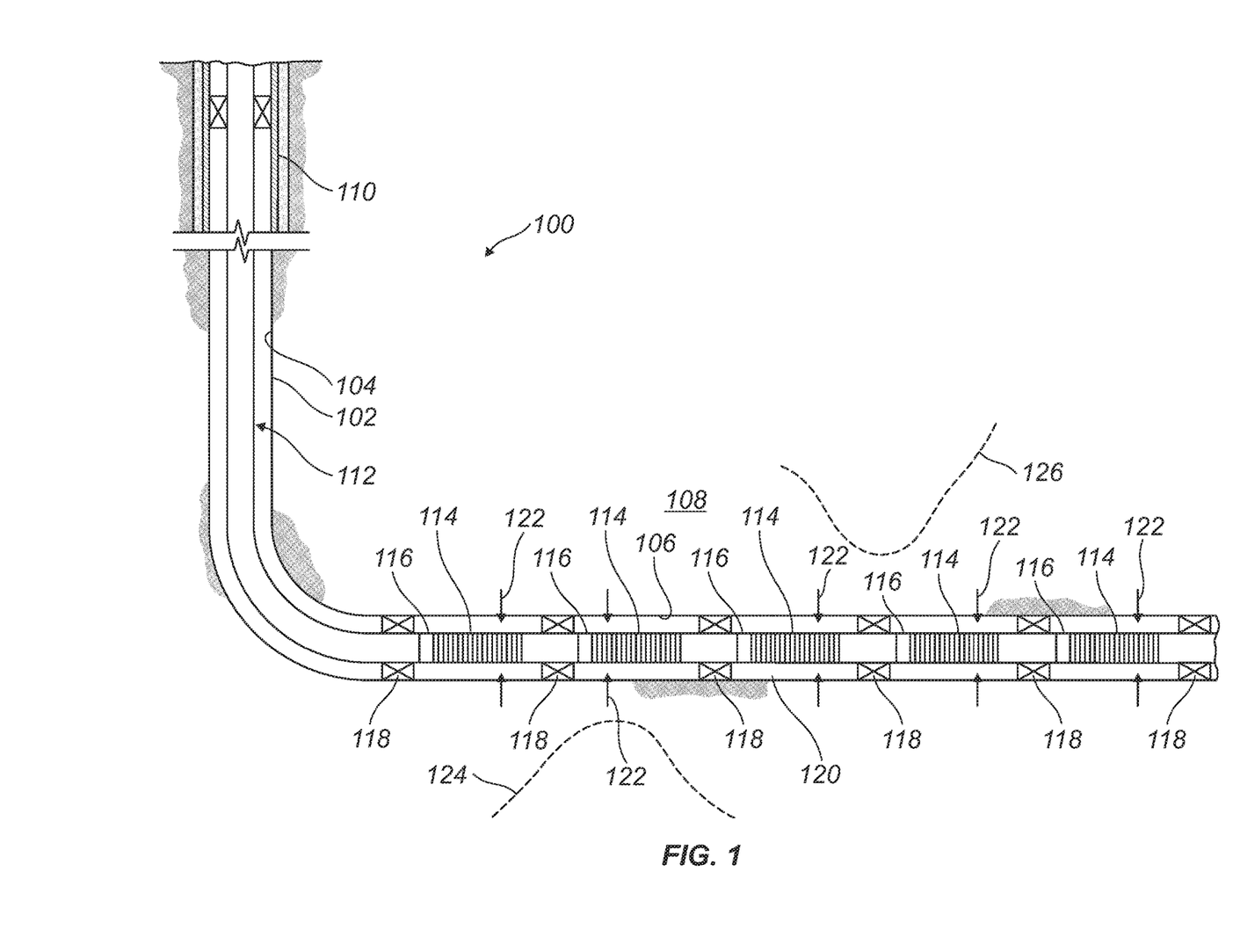
FIG. 1 illustrates an example of a well system.

FIG. 1 illustrates a well system 100 which may embody principles of the present disclosure, according to one or more examples. As illustrated, well system 100 may include a wellbore 102 that comprises a generally vertical uncased section 104 that may transition into a generally horizontal section 106 that is uncased extending through a subterranean formation 108. In some examples, the vertical section 104 may extend downwardly from a portion of wellbore 102 having a string of casing 110 cemented therein. A tubular string, such as production tubing 112, may be installed in or otherwise extended into wellbore 102.

As depicted, a plurality of well screens 114, flow control devices 116, and packers 118 may be interconnected along production tubing 112, such as along portions of the production tubing 112 in horizontal section 106 of wellbore 102. Packers 118 may be configured to seal off an annulus 120 defined between production tubing 112 and the walls of wellbore 102. As a result, fluids 122 may be produced from multiple intervals of the surrounding subterranean formation 108 via isolated portions of annulus 120 between adjacent pairs of packers 118.

As illustrated, in some examples, a well screen 114 and a flow control device 116 may be interconnected in production tubing 112 and positioned between a pair of packers 118. Without limitation, well screens 114 may be swell screens, wire wrap screens, mesh screens, sintered screens, expandable screens, pre-packed screens, treating screens, or other known screen types. In operation, well screen 114 may be configured to filter fluids 122 flowing into production tubing 112 from annulus 120. Flow control device 116 may be configured to restrict or otherwise regulate the flow of fluids 122 into production tubing 112, based on certain physical characteristics of the fluids. In examples, flow control device 116 may be a centrifugal fluid selector, wherein a portion of the centrifugal fluid selector may be actuated to rotate by the flow of fluids 122.

Without limitation, flow control device 116 may be an autonomous flow control device. The autonomous flow control device may utilize fluid dynamics and delay the flow of unwanted fluids such as water and/or gas into the interior of production tubing 112. The autonomous flow control device may operate as a passive flow control device, not requiring operator intervention. In examples, the operator may be defined as an individual, group of individuals, or an organization. The autonomous flow control device may be any suitable shape. Without limitation, a suitable shape may include, but is not limited to, cross-sectional shapes that are circular, elliptical, triangular, rectangular, square, hexagonal, and/or combinations thereof. The autonomous flow control device may be made from any suitable material. Suitable materials may include, but are not limited to, metals, nonmetals, polymers, ceramics, and/or combinations thereof. Without limitation, the autonomous flow control device may be made from tungsten carbide and/or steel.

It will be appreciated that well system 100 is merely one example of a wide variety of well systems in which the principles of this disclosure may be utilized. Accordingly, it should be understood that the principles of this disclosure are not necessarily limited to any of the details of the depicted well system 100, or the various components thereof, depicted in the drawings or otherwise described herein. For example, it is not necessary in keeping with the principles of this disclosure for wellbore 102 to include a generally vertical section 104 or a generally horizontal section 106. Moreover, it is not necessary for fluids 122 to be only produced from subterranean formation 108 since, in other examples, fluids may be injected into subterranean formation 108, or fluids 122 may be both injected into and produced from subterranean formation 108, without departing from the scope of the disclosure.

Furthermore, it is not necessary that at least one well screen 114 and flow control device 116 be positioned between a pair of packers 118. Nor is it necessary for a single flow control device 116 to be used in conjunction with a single well screen 114. Rather, any number, arrangement and/or combination of such components may be used, without departing from the scope of the disclosure. In some applications, it is not necessary for flow control device 116 to be used with a corresponding well screen 114. For example, in injection operations, the injected fluid could be flowed through flow control device 116, without also flowing through well screen 114.

Those skilled in the art will readily recognize the advantages of being able to regulate the flow of fluids 122 into production tubing 112 from each zone of subterranean formation 108, for example, to prevent water coning 124 or gas coning 126 in subterranean formation 108. Other uses for flow regulation in a well may include, but are not limited to, balancing production from (or injection into) multiple zones, minimizing production or injection of undesired fluids, maximizing production or injection of desired fluids, etc.

Figure 2:
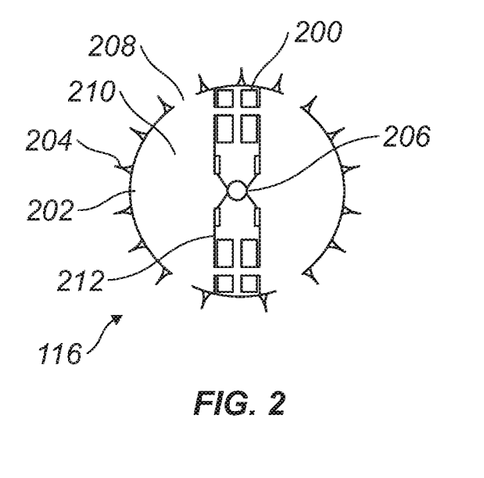
FIG. 2 illustrates a schematic view showing the positions of floats as a flow control device operates.
Figure 3:
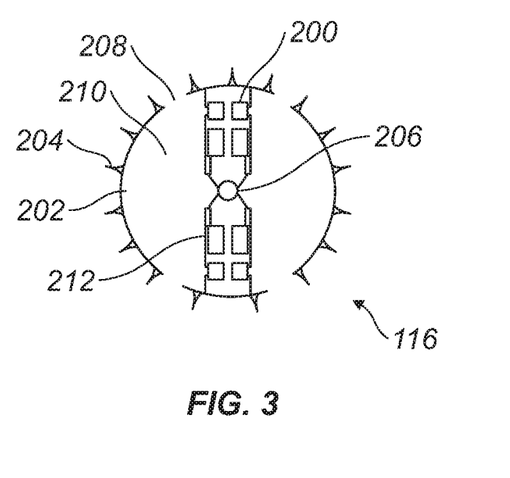
FIG. 3 illustrates a schematic view showing the positions of floats as a flow control device operates.
Figure 4:
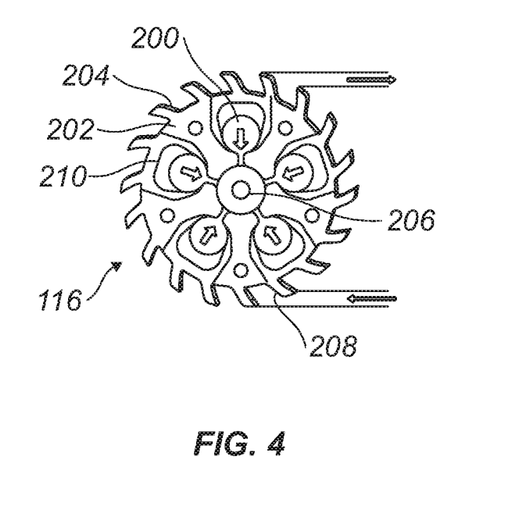
FIG. 4 illustrates an example flow control device with circular floats.
Figure 5:
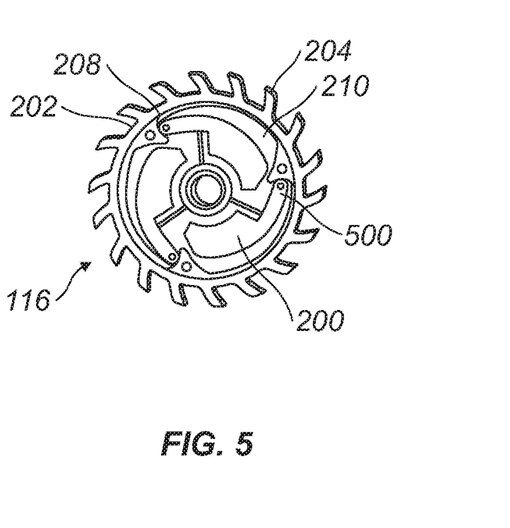
FIG. 5 illustrates an example flow control device with hinged floats.

FIGS. 2-5 illustrate different views of flow control device 116. FIGS. 2 and 3 depict a schematic view showing the positions of floats 200 as flow control device 116 operates. FIGS. 4 and 5 illustrate various example flow control devices 116 with different arrangements for floats 200. Flow control device 116 may be designed to regulate the flow of fluids 122 (i.e., referring to FIG. 1) into production tubing 112 (i.e., referring to FIG. 1). Flow control device 116 may comprise a housing 202, protrusions 204, an outlet 206, and floats 200.

In examples, housing 202 may be any suitable size, height, and/or shape. Without limitation, a suitable shape may include, but is not limited to, cross-sectional shapes that are circular, elliptical, triangular, rectangular, square, hexagonal, and/or combinations thereof. In certain examples, housing 202 may be circular. Housing 202 may encase the internal components of flow control device 116. In examples, housing 202 may protect the internal components of flow control device 116 from an external environment. In certain examples, housing 202 may comprise protrusions 204.

Protrusions 204 may be extensions of material from the diameter of housing 202. In examples, protrusions 204 may be any suitable size, height, and/or shape. Without limitation, a suitable shape may include, but is not limited to, cross-sectional shapes that are circular, elliptical, triangular, rectangular, square, hexagonal, and/or combinations thereof. In certain examples, protrusions 204 may visually appear and physically operate similarly to teeth on a mechanical gear.

In alternate examples, protrusions 204 may be extensions of material from a ring of material that is coupled to housing 202. In these examples, the inner diameter of the ring of material may be equal to or larger than the diameter of housing 202. Depending on the inner diameter of the ring of material, there may or may not be an annulus between the ring of material and housing 202. During operations of flow control device 116, a portion of flow control device 116 may be disposed within a flow path of fluids 122 (i.e., referring to FIG. 1). In examples, the flow of fluids 122 may interact with protrusions 204. As the pressure of fluids 122 increases at a contact point between fluids 122 and protrusions 204, protrusions 204 may be actuated to rotate. In certain examples, housing 202 may rotate along with protrusions 204. In alternate examples, housing 202 may remain stationary as protrusions 204 rotate around housing 202.

In examples, there may be an opening 208 between protrusions 204 that allows access to an internal chamber 210 of housing 202. There may be a plurality of openings 208 that allow fluids 122 to flow from the flow path, between a set of protrusions 204, and into internal chamber 210. In examples, internal chamber 210 may be any suitable size, height, and/or shape. Without limitation, a suitable shape may include, but is not limited to, cross-sectional shapes that are circular, elliptical, triangular, rectangular, square, hexagonal, and/or combinations thereof. Internal chamber 210 may comprise various structures and/or supports that guide the flow of fluids 122 towards outlet 206.

In examples, outlet 206 may be disposed within internal chamber 210 of housing 202. Outlet 206 may be an opening that allows fluids 122 to exit flow control device 116. Outlet 206 may be coupled to a control line (discussed further below), wherein fluids 122 may flow through the control line and engage a valve (discussed further below). In examples, fluids 122 that flowed through the control line may enter into the interior of production tubing 112 (i.e., referring to FIG. 1) from the valve. Alternatively, the valve may prevent the flow of fluids 122 into the interior of production tubing 112. Without limitations, fluids 122 may be able to flow through outlet 206 depending on the configuration of floats 200.

Floats 200 may block a potential flow path of fluids 122 while in an initial position. Floats 200 may be structures designed to float when disposed in a particular fluid due to having a lower density than said fluid. Floats 200 may be made from any suitable material. Suitable materials may include, but are not limited to, metals, nonmetals, polymers, ceramics, and/or combinations thereof. Without limitations, floats 200 may be made from any material that is less dense than water and/or denser than oil. In examples, floats 200 may be any suitable size, height, and/or shape. Without limitation, a suitable shape may include, but is not limited to, cross-sectional shapes that are circular, elliptical, triangular, rectangular, square, hexagonal, and/or combinations thereof. With reference to FIGS. 2 and 3, floats 200 may have a square cross-sectional shape. With reference to FIG. 4, floats 200 may have a circular cross-sectional shape.

In examples, as best seen on FIG. 5, floats 200 may be a customized shape and rotate about a hinge 500. As fluids 122 (i.e., referring to FIG. 1) enter flow control device 116 through opening 208, fluids 122 may push against floats 200 causing floats 200 to displace. As floats 200 displace due to a density difference, floats 200 may rotate about hinge 500. In alternate examples, floats 200 may be able to displace freely, as best seen on FIG. 4. With continued reference to either FIG. 4 or 5, as floats 200 displace due to the introduction of fluids 122, a potential flow path that leads to outlet 206 may become available to fluids 122.

In alternate examples, floats 200 may slide along a wall. Referring to FIGS. 2 and 3, floats 200 may be disposed between a set of walls 212 so as to constrain the path of motion of floats 200 to be one-dimensional. Floats 200 may block a potential flow path for fluids 122 to travel through in order to reach outlet 206. As flow control device 116 rotates, floats 200 may be displaced inwards. This may inhibit access to the potential flow path that leads to outlet 206. As fluids 122 enter internal chamber 210 through opening 208, fluids 122 may attempt to travel through the potential flow path and out of flow control device 116 through outlet 206. If fluids 122 comprise a large concentration of water, floats 200 may remain positioned inwards towards outlet 206 and thereby block the potential flow path. If fluids 122 comprise a large concentration of oil, floats 200 may displace towards an outwards position, as floats 200 may be denser than oil. In other examples, flow control device 116 may be configured to restrict fluids 122 comprising a large concentration of oil and allowing fluids 122 comprising a large concentration of water to pass through outlet 206.

Figure 6:
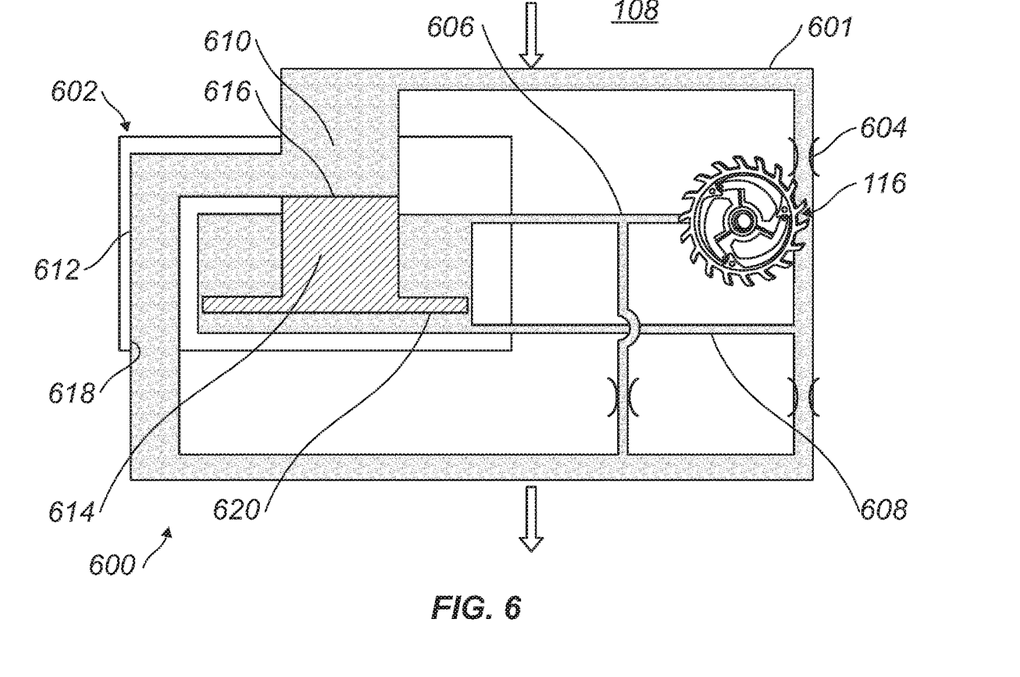
FIG. 6 illustrates a flow system of the fluid flow of fluids from a subterranean formation to the interior of a production tubing.
Figure 7:
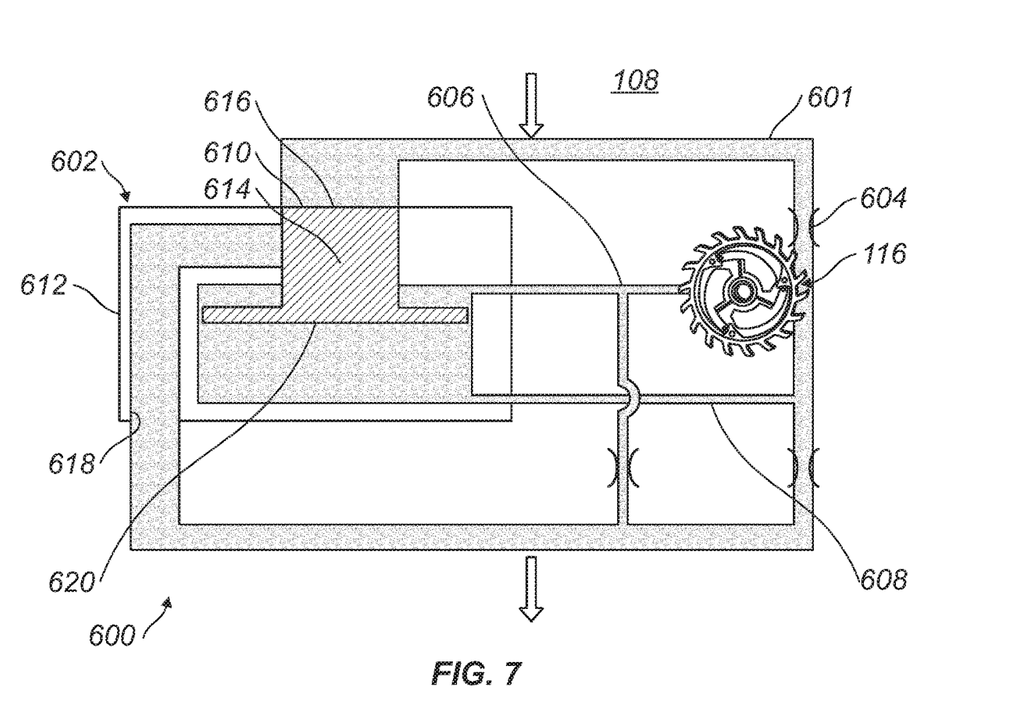
FIG. 7 illustrates a flow system of the fluid flow of fluids from a subterranean formation to the interior of a production tubing.

FIGS. 6 and 7 illustrate a diagram of a flow system 600 of the fluid flow of fluids 122 (i.e., referring to FIG. 1) from subterranean formation 108 to the interior of production tubing 112 (i.e., referring to FIG. 1). FIG. 6 illustrates flow system 600 allowing the flow of fluids 122 straight from subterranean formation 108 into production tubing 112. FIG. 7 illustrates flow system 600 restricting a majority of the flow of fluids 122 straight from subterranean formation 108 into production tubing 112. Flow system 600 may control the flow of fluids 122 into and/or out of the interior of production tubing 112. In examples, flow system 600 may be disposed on an exterior portion of production tubing 112, within production tubing 112, on an interior portion of production tubing 112, and/or combinations thereof. Without limitations, flow system 600 may comprise a fluid pathway 601, a regulatory valve 602, flow control device 116, a fluid restrictor 604, a control line 606, and an offset line 608. In examples, fluid pathway 601 may be a hollow structure in which a potential fluid may traverse through. Fluid pathway 601 may provide a flow path for fluids 122. Without limitations, fluid pathway 601 may be any suitable piping, tubing, conduit, etc. Fluid pathway 601 may have any suitable size, height, and/or shape. Fluid pathway 601 may direct a portion of a flow of fluids 122 towards flow control device 116. Further, fluid pathways 601 may direct a remaining portion of a flow of fluids 122 towards regulatory valve 602.

Without limitations, regulatory valve 602 may be a shuttle valve, an inverse shuttle valve, a ball valve, a diaphragm shuttle valve, a bellows valve, a pilot-operated valve, a pilot-operated check valve, and/or the like. If regulatory valve 602 is a type of shuttle valve, the shuttle may be a ball shuttle. Regulatory valve 602 may be any suitable size, height, and/or shape. Regulatory valve 602 may serve to regulate the flow of fluids 122 from subterranean formation 108 into the interior of production tubing 112 (i.e., referring to FIG. 1) with assistance from flow control device 116. As illustrated, regulatory valve 602 may experience pressure from the flow of fluids 122 directly from subterranean formation 108.

A portion of the flow of fluids 122 may enter into regulatory valve 602 through a valve inlet 610 of a valve housing 612 while the remainder of the portion of the flow of fluids 122 may flow through fluid restrictor 604 prior to engaging with flow control device 116. In examples, the pressure supplied from subterranean formation 108 may apply a first force to a piston 614 disposed within valve housing 612. The first force applied may be dependent on a cross-sectional area of a first end 616 of piston 614. First end 616 may be actuated to displace in a path of motion that either inhibits or allows the flow of fluids 122 through regulatory valve 602. In examples when first end 616 allows the flow of fluids through regulatory valve 602, the flow of fluids 122 may exit regulatory valve through valve outlet 618. The fluids 122 may then flow into the interior of production tubing 112.

As illustrated, a portion of flow control device 116 may be disposed within the flow of fluids 122. The flow of fluids 122 from subterranean formation 108 may travel through and/or past flow control device 116. Prior to engaging with flow control device 116, fluids 122 may pass through fluid restrictor 604. Fluid restrictor 604 may serve to reduce the flow and/or pressure of fluids 122. In examples, there may be a plurality of fluid restrictors 604 within flow system 600. Without limitations, fluid restrictor 604 may be a nozzle, a vortex, a change in tubing and/or pipe diameter, fluid diode, and/or other centrifugal fluid selector. Once fluids 122 have passed through fluid restrictor 604, the flow of fluids 122 may cause flow control device 116 to rotate.

In examples, fluids 122 may enter into flow control device 116 as flow control device 116 rotates. In certain examples, fluids 122 may exit flow control device 116 and flow through control line 606, wherein control line 606 may be coupled to outlet 206 (i.e., referring to FIGS. 2 and 3). Control line 606 may subsequently be coupled to regulatory valve 602 at an opposing end from outlet 206. As illustrated, there may be another fluid restrictor 604 disposed in flow system 600 that branches off from control line 606 to provide a parallel flow path configuration for fluids 122. As fluids 122 follow the path of least resistance, the flow of fluids 122 into regulatory valve 602 may be induced by this placement of fluid restrictor 604.

As fluids 122 travel through control line 606 and into regulatory valve 602, fluids 122 may apply a second pressure to a second end 620 of piston 614. In examples, the second pressure supplied from control line 606 may apply a second force to piston 614. The second force applied may be dependent on a portion of the cross-sectional area of second end 620 of piston 614. The first force and the second force may be applied to piston 614 in the same direction.

In examples wherein fluids 122 does not enter into flow control device 116 but travels past flow control device 116, fluids 122 may apply a third pressure to piston 614 located at second end 620 by traversing through offset line 608. In examples, the third pressure supplied by fluids 122 that have travelled past flow control device 116 may apply a third force to piston 614. The third force applied may be dependent on the cross-sectional area of second end 620. During operations, the third force may be applied to piston 614 in a direction opposing that of the direction of the first and/or second forces. As illustrated, there may be another fluid restrictor 604 disposed in flow system 600 past flow control device 116 to provide a parallel flow path configuration for fluids 122 from offset line 608. As fluids 122 follow the path of least resistance, the flow of fluids 122 into regulatory valve 602 towards second end 620 of piston 614 may be induced by this placement of fluid restrictor 604.

If fluids 122 mostly comprises of oil, then fluids 122 may enter and exit flow control device 116 and flow through control line 606, wherein control line 606 may be coupled to regulatory valve 602 (as best shown on FIG. 6). The pressures supplied by the flow of fluids 122 immediately from subterranean formation 108 and through control line 606 may actuate piston 614 to displace so that first end 616 does not inhibit the flow of fluids 122 from entering into valve inlet 610 and exiting through valve outlet 618. If fluids 122 mostly comprises of water, then there may be little flow of fluids 122 through flow control device 116 and subsequently through control line 606 (as best shown on FIG. 7). In this example, a majority of the fluids 122 may flow past flow control device 116. As such, the pressure applied to second end 620 of piston 614 supplied by the fluids 122 that have travelled past flow control device 116 may be greater than the pressure supplied by control line 606. This pressure may actuate piston 614 to displace so that first end 616 inhibits the flow of fluids 122 from entering into valve inlet 610.

Figure 8:
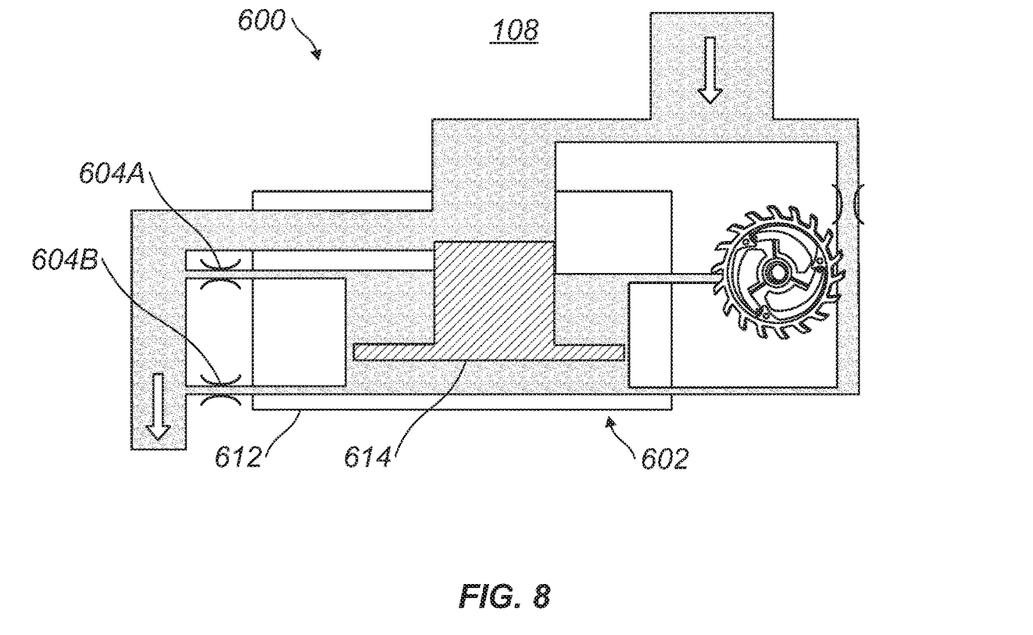
FIG. 8 illustrates a flow system of the fluid flow of fluids from a subterranean formation to the interior of a production tubing.
Figure 9:
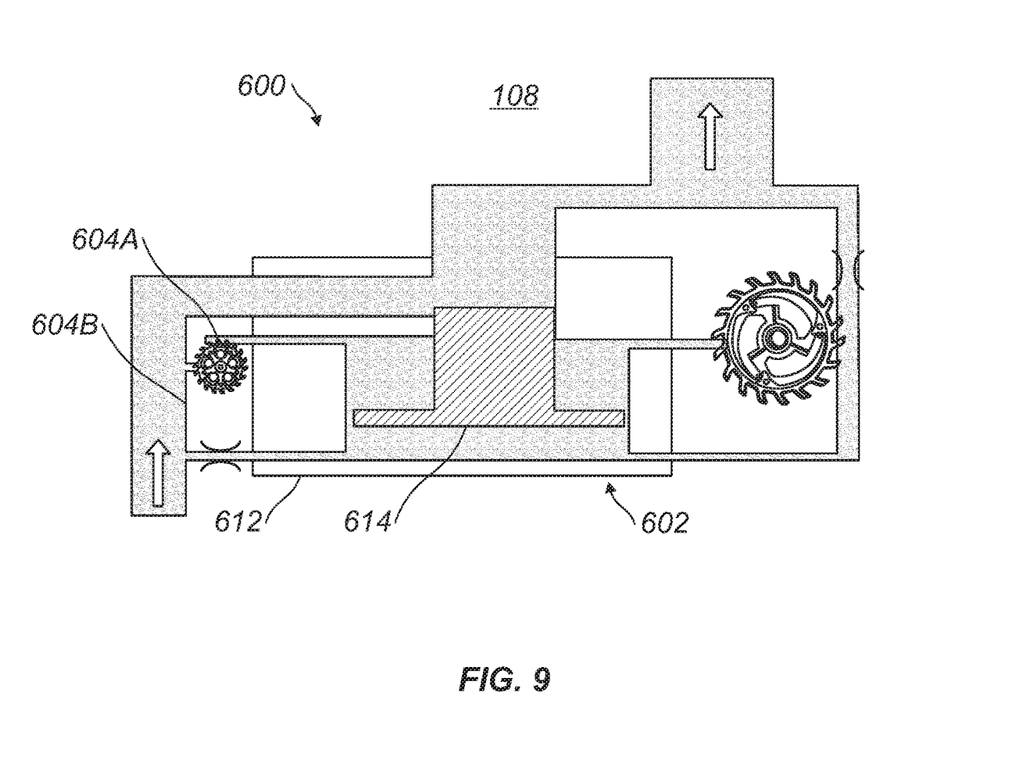
FIG. 9 illustrates a flow system of the fluid flow of fluids from an interior of a production tubing to a subterranean formation.

FIGS. 8 and 9 illustrate different examples of flow system 600. FIG. 8 illustrates flow system 600 producing the flow of fluids 122 (i.e., referring to FIG. 1) from subterranean formation 108 into production tubing 112 (i.e., referring to FIG. 1). FIG. 9 illustrates flow system 600 performing an injection process from inside production tubing 112 into subterranean formation 108. The flow systems 600 depicted in FIGS. 8 and 9 may operate in a similar fashion as those described in previous examples. As illustrated in both FIGS. 8 and 9, the potential flow paths of fluids 122 may be interrupted by the displacement of piston 614. Further, to prevent the build-up of debris within the flow system 600, placement of a first fluid restrictor 604A and a second fluid restrictor 604B may occur so that any potential flow path of fluids 122 runs through regulatory valve 602. The present flow systems 600 may provide fluid flow into and/or out of regulatory valve 602, wherein the fluid displacement provided by the fluid flow may carry away debris that has settled within regulatory valve 602. In certain examples, first fluid restrictor 604A may be a fluid diode (as best shown on FIG. 9). This may be beneficial in injection operations as a fluid diode has a smaller flow resistance in one preferred direction compared to an opposite direction.

Figure 10:
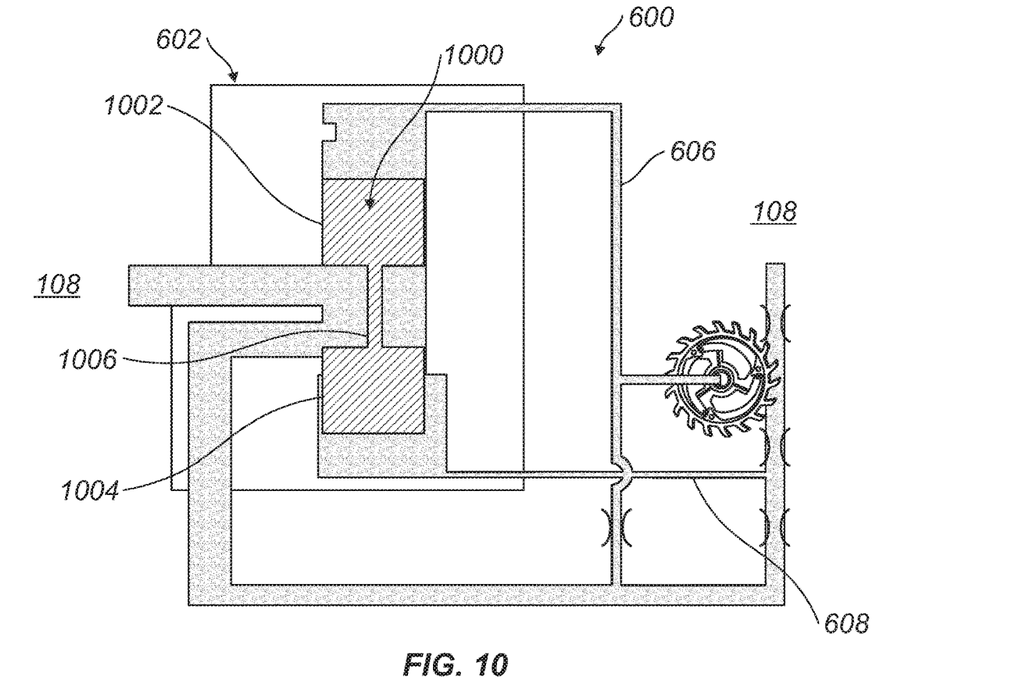
FIG. 10 illustrates a flow system of the fluid flow of fluids from a subterranean formation to the interior of a production tubing.
Figure 11:
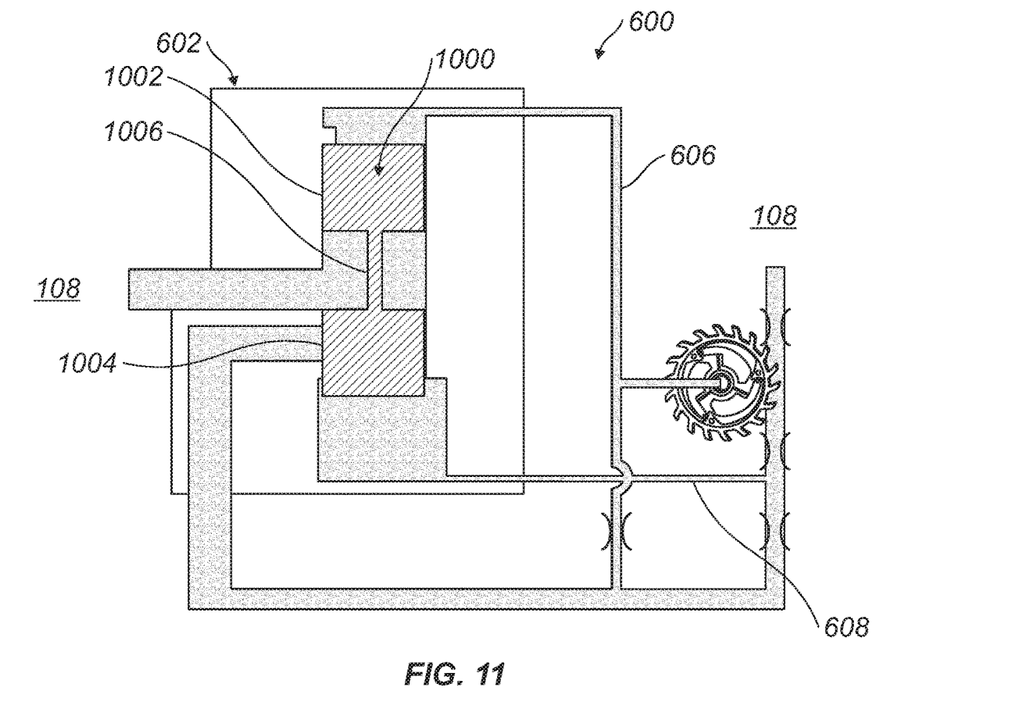
FIG. 11 illustrates a flow system of the fluid flow of fluids from a subterranean formation to the interior of a production tubing.

FIGS. 10 and 11 illustrate different examples of flow system 600. FIG. 10 illustrates flow system 600 allowing the flow of fluids 122 (i.e., referring to FIG. 1) straight from subterranean formation 108 into production tubing 112 (i.e., referring to FIG. 1). FIG. 11 illustrates flow system 600 preventing the flow of fluids 122 straight from subterranean formation 108 into production tubing 112. The flow systems 600 depicted in FIGS. 10 and 11 may operate in a similar fashion as those described in previous examples. Concerning the present examples, regulatory valve 602 may be a pilot operated shuttle valve. Without limitations, the pilot operated shuttle valve may be a valve which allows fluids 122 to flow through from one of two sources. Additionally, the pilot operated shuttle valve may comprise a blocking element 1000, wherein the blocking element 1000 is configured to displace when actuated upon by an external pressure. Blocking element 1000 may be any suitable size, height, and/or shape. As illustrated, blocking element 1000 may comprise a first end piece 1002 coupled to a second end piece 1004 by a connecting rod 1006. In examples, first end piece 1002 may prevent the flow of fluids 122 from subterranean formation 108 into regulatory valve 602 to be in fluid communication with the flow of fluids 122 from control line 606. Further, second end piece 1004 may prevent the flow of fluids 122 from subterranean formation 108 into regulatory valve 602 to be in fluid communication with the flow of fluids 122 from offset line 608. Connecting rod 1006 may serve to affix first end piece 1002 to second end piece 1004 so that first end piece 1002 may displace accordingly with second end piece 1004 when one of the two is actuated upon by fluid pressure supplied by control line 606 and/or offset line 608.

Figure 12:
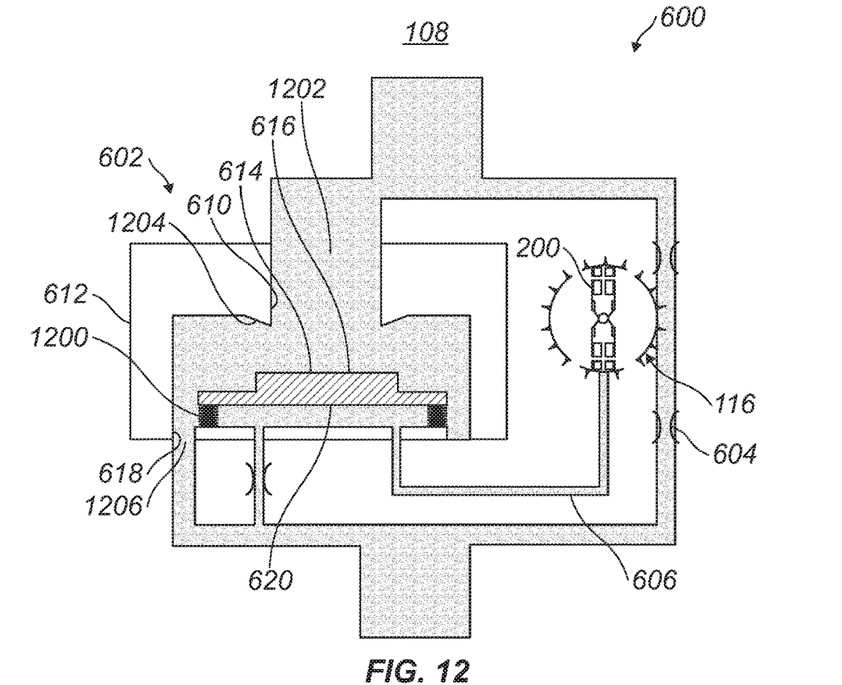
FIG. 12 illustrates a flow system of the fluid flow of fluids from a subterranean formation to the interior of a production tubing.
Figure 13:
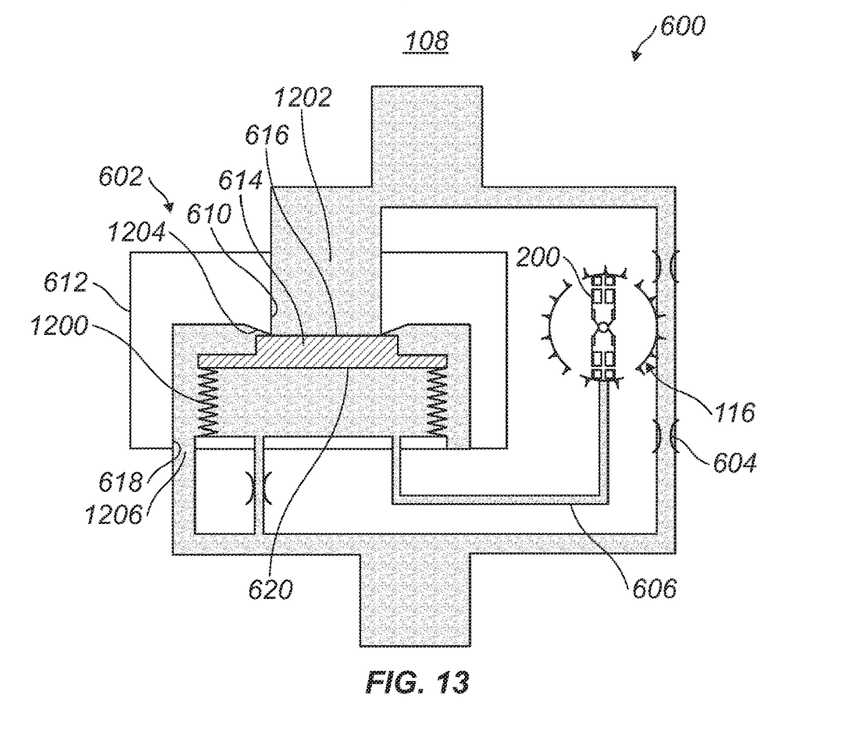
FIG. 13 illustrates a flow system of the fluid flow of fluids from a subterranean formation to the interior of a production tubing.

FIGS. 12 and 13 illustrate different examples of flow system 600. FIG. 12 illustrates flow system 600 allowing the flow of fluids 122 (i.e., referring to FIG. 1) straight from subterranean formation 108 into production tubing 112 (i.e., referring to FIG. 1). FIG. 13 illustrates flow system 600 preventing the flow of fluids 122 straight from subterranean formation 108 into production tubing 112. The flow systems 600 depicted in FIGS. 12 and 13 may operate in a similar fashion as those described in previous examples. In these particular examples, floats 200 within flow control device 116 may be arranged so that flow control device 116 may restrict fluids 122 mainly comprising oil rather than water.

Concerning the present examples, regulatory valve 602 may comprise piston 614 coupled to valve housing 612 by bellows 1200. In alternate examples, a diaphragm (not illustrated) may be used in place of bellows 1200. Bellows 1200 may be any suitable size, height, and/or shape and may comprise walls that expand and/or compress when acted upon. Bellows 1200 may couple piston 614 onto an internal wall of valve housing 612 through the use of any suitable mechanisms, including, but not limited to, the use of suitable fasteners, threading, adhesives, welding, and/or combinations thereof. Without limitation, suitable fasteners may include nuts and bolts, washers, screws, pins, sockets, rods and studs, hinges and/or any combination thereof.

Regulatory valve 602 may further comprise an inlet restriction 1202, a piston seat 1204, and an outlet restriction 1206. Without limitations, inlet restriction 1202 may be any of a nozzle, a vortex, a change in tubing and/or pipe diameter, fluid diode, and/or other centrifugal fluid selector disposed near valve inlet 610. Piston seat 1204 may serve to receive piston 614 as piston 614 is actuated to displace linearly. Piston seat 1204 may have any suitable size, height, and/or shape compatible to receive piston 614. In examples, there may be a pressure drop as the flow of fluids 122 passes piston seat 1204. As the flow of fluids 122 travels through regulatory valve 602, fluids may encounter outlet restriction 1206. Without limitations, outlet restriction 1206 may be any of a nozzle, a vortex, a change in tubing and/or pipe diameter, fluid diode, and/or other centrifugal fluid selector disposed near valve outlet 618.

If fluids 122 mostly comprises of oil, then there may be little flow of fluids 122 through flow control device 116 and subsequently through control line 606 (as best shown on FIG. 12). In this example, fluids 122 may flow past flow control device 116 and encounter a pressure reduction from fluid restrictor 604. As the pressure within this flow path of fluids 122 has been greatly reduced, fluids 122 may alternatively flow through regulatory valve 602. As these fluids 122 comprise pressure from subterranean formation 108 and there is little to no pressure being applied to piston 614 from control line 606, piston 614 may be actuated to displace so as to allow fluids 122 to flow out of valve outlet 618 and into an interior of production tubing 112. Displacing piston 614 to create a greater flow path for fluids 122 may comprise of compressing bellows 1200.

If fluids 122 mostly comprises of water, then fluids 122 may enter and exit flow control device 116 and flow through control line 606, wherein control line 606 may be coupled to regulatory valve 602 (as best shown on FIG. 13). As illustrated, control line 606 may exit into an interior of bellows 1200. As control line 606 provides fluids 122 in an interior of bellows 1200, the pressure within may build and be applied to second end 620 of piston 614. In examples, the pressure applied to second end 620 may be greater than the pressure supplied by subterranean formation 108. The pressure supplied by subterranean formation 108 may encounter inlet restriction 1202 and piston seat 1204 prior to being applied to first end 616 of piston 614. As such, piston 614 may be actuated to displace so that first end 616 inhibits the flow of fluids 122 from entering into valve inlet by abutting against piston seat 1204.

Accordingly, this disclosure describes systems, methods, and apparatuses that may relate to valves used with an autonomous flow control device. The systems, methods, and apparatus may further be characterized by one or more of the following statements.

Statement 1. A flow system, comprising: a flow control device, wherein a portion of the flow control device is disposed within a fluid pathway, wherein the fluid pathway is configured to allow a portion of fluids to pass through towards the flow control device, wherein the flow control device is configured to rotate, wherein the flow control device comprises floats, wherein the floats block a potential flow path for fluids to travel through an outlet of the flow control device; a regulatory valve, wherein the regulatory valve is configured to receive a remaining portion of fluids from the fluid pathway; a control line, wherein the control line couples the outlet of the flow control device to the regulatory valve; an offset line, wherein the offset line provides fluid communication between fluids that travel past the flow control device and the regulatory valve; and a fluid restrictor, wherein the fluid restrictor is disposed within the fluid pathway upstream from the flow control device, wherein the fluid restrictor is configured to reduce fluid pressure.

Statement 2. The flow system of statement 1, wherein the flow system is disposed within a production tubular string, wherein the flow system is disposed at a well screen.

Statement 3. The flow system of statement 2, wherein the well screen is configured to filter the fluids prior to the fluids entering into the flow system, wherein the well screen is selected from a group consisting of swell screens, wire wrap screens, mesh screens, sintered screens, expandable screens, pre-packed screens, and treating screens.

Statement 4. The flow system of any of the preceding statements, further comprising more than one of the fluid restrictor.

Statement 5. The flow system of any of the preceding statements, wherein the fluid restrictor is selected from a group consisting of a nozzle, a vortex, a change in tubing diameter, a change in pipe diameter, a fluid diode, and a centrifugal fluid selector.

Statement 6. The flow system of any of the preceding statements, wherein the regulatory valve comprises: a valve housing; a valve inlet, wherein the valve inlet is configured to allow fluids to enter into the valve housing; a valve outlet, wherein the valve outlet is configured to allow fluids to exit the valve housing; and a piston, wherein the piston is disposed inside the valve housing, wherein the piston comprises a first end and a second end.

Statement 7. The flow system of statement 6, wherein the fluid pathway is configured to apply a first pressure to the first end of the piston, wherein the control line is configured to apply a second pressure to the second end of the piston, wherein the first pressure and the second pressure are applied in the same direction, wherein the offset line is configured to apply a third pressure to the second end, wherein the third pressure is applied in an opposing direction in relation to the first pressure and the second pressure.

Statement 8. The flow system of statement 6, wherein the regulatory valve further comprises: an inlet restriction; a piston seat, wherein the piston seat is configured to receive the piston as the piston displaces linearly; and an outlet restriction.

Statement 9. The flow system of statement 8, further comprising bellows or a diaphragm, wherein the bellows or the diaphragm couples the second end of the piston to an interior wall of the valve housing.

Statement 10. The flow system of any of the preceding statements, wherein the regulatory valve is a shuttle valve, wherein the regulatory valve comprises a blocking element, wherein the blocking element is configured to displace when actuated upon by an external pressure.

Statement 11. The flow system of statement 10, wherein the blocking element comprises: a first end piece, wherein the first end piece prevents fluid communication between flow of fluids from a subterranean formation and flow of fluids from the control line; a second end piece, wherein the second end piece prevents fluid communication between the flow of fluids from the subterranean formation and the flow of fluids from the offset line; and a connecting rod, wherein the connecting rod couples the first end piece to the second end piece.

Statement 12. The flow system of any of the preceding statements, wherein the floats are configured to be less dense than water and denser than oil.

Statement 13. The flow system of any of the preceding statements, wherein the floats are disposed between a set of walls, wherein the floats are configured to slide linearly along the set of walls.

Statement 14. The flow system of any of the preceding statements, wherein the floats are coupled to a housing of the flow control device by a hinge, wherein the floats rotate about the hinge.

Statement 15. A method of regulating fluids from a subterranean formation, comprising: directing a portion of a flow of fluids to a flow control device and a remaining portion of the flow of the fluids to a regulatory valve through a fluid pathway; rotating the flow control device; reducing a pressure of the fluids; and displacing a piston disposed within the regulatory valve, wherein the piston comprises a first end and a second end.

Statement 16. The method of statement 15, wherein rotating the flow control device further comprises displacing floats disposed within the flow control device to allow fluids to travel through the flow control device.

Statement 17. The method of statement 15 or 16, further comprising applying a first pressure to the first end of the piston, wherein the first pressure is provided by fluids from the subterranean formation through the fluids pathway.

Statement 18. The method of statement 17, further comprising applying a second pressure to the second end of the piston, wherein the second pressure is provided by fluids from a control line coupling an outlet of the flow control device to the regulatory valve.

Statement 19. The method of statement 18, wherein the first pressure and the second pressure are applied in the same direction.

Statement 20. The method of statement 19, further comprising applying a third pressure to the second end of the piston, wherein the third pressure is provided by fluids from an offset line, wherein the third pressure is applied in an opposing direction in relation to the first pressure and the second pressure.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A flow system, comprising:
    a flow control device, wherein a portion of the flow control device is disposed within a fluid pathway, wherein the fluid pathway is configured to allow a portion of fluids to pass through towards the flow control device, wherein the flow control device is configured to rotate, wherein the flow control device comprises floats, wherein the floats are operable to allow fluids to travel through an outlet of the flow control device based on a density of the fluids;
    a regulatory valve, wherein the regulatory valve is configured to receive a remaining portion of fluids from the fluid pathway;
    a control line, wherein the control line couples the outlet of the flow control device to the regulatory valve;
    an offset line, wherein the offset line provides fluid communication between fluids that travel past the flow control device and the regulatory valve; and
    a fluid restrictor, wherein the fluid restrictor is disposed within the fluid pathway upstream from the flow control device, wherein the fluid restrictor is configured to reduce fluid pressure.

2. The flow system of claim 1, wherein the flow system is disposed within a production tubular string, wherein the flow system is disposed at a well screen.

3. The flow system of claim 2, wherein the well screen is configured to filter the fluids prior to the fluids entering into the flow system, wherein the well screen is selected from a group consisting of swell screens, wire wrap screens, mesh screens, sintered screens, expandable screens, pre-packed screens, and treating screens.

4. The flow system of claim 1, further comprising more than one of the fluid restrictor.

5. The flow system of claim 1, wherein the fluid restrictor is selected from a group consisting of a nozzle, a vortex, a change in tubing diameter, a change in pipe diameter, a fluid diode, and a centrifugal fluid selector.

6. The flow system of claim 1, wherein the regulatory valve comprises:
    a valve housing;
    a valve inlet, wherein the valve inlet is configured to allow fluids to enter into the valve housing;
    a valve outlet, wherein the valve outlet is configured to allow fluids to exit the valve housing; and
    a piston, wherein the piston is disposed inside the valve housing, wherein the piston comprises a first end and a second end.

7. The flow system of claim 6, wherein the fluid pathway is configured to apply a first pressure to the first end of the piston, wherein the control line is configured to apply a second pressure to the second end of the piston, wherein the first pressure and the second pressure are applied in the same direction, wherein the offset line is configured to apply a third pressure to the second end, wherein the third pressure is applied in an opposing direction in relation to the first pressure and the second pressure.

8. The flow system of claim 6, wherein the regulatory valve further comprises:
    an inlet restriction;
    a piston seat, wherein the piston seat is configured to receive the piston as the piston displaces linearly; and
    an outlet restriction.

9. The flow system of claim 8, further comprising bellows or a diaphragm, wherein the bellows or the diaphragm couples the second end of the piston to an interior wall of the valve housing.

10. The flow system of claim 1, wherein the regulatory valve is a shuttle valve, wherein the regulatory valve comprises a blocking element, wherein the blocking element is configured to displace when actuated upon by an external pressure.

11. The flow system of claim 10, wherein the blocking element comprises:
- a first end piece, wherein the first end piece prevents fluid communication between flow of fluids from a subterranean formation and flow of fluids from the control line;
- a second end piece, wherein the second end piece prevents fluid communication between the flow of fluids from the subterranean formation and the flow of fluids from the offset line; and
- a connecting rod, wherein the connecting rod couples the first end piece to the second end piece.

12. The flow system of claim 1, wherein the floats are configured to be less dense than water and denser than oil.

13. The flow system of claim 1, wherein the floats are disposed between a set of walls, wherein the floats are configured to slide linearly along the set of walls.

14. The flow system of claim 1, wherein the floats are coupled to a housing of the flow control device by a hinge, wherein the floats rotate about the hinge.

15. A method of regulating fluids from a subterranean formation, comprising:
- directing a portion of a flow of fluids to a flow control device and a remaining portion of the flow of the fluids to a regulatory valve through a fluid pathway;
- rotating the flow control device to displace floats disposed within the flow control device to allow fluids to travel through the flow control device based on a density of the fluids;
- reducing a pressure of the fluids; and
- displacing a piston disposed within the regulatory valve, wherein the piston comprises a first end and a second end.

16. The method of claim 15, further comprising applying a first pressure to the first end of the piston.

17. The method of claim 16, wherein the first pressure is provided by fluids from the subterranean formation through the fluids pathway.

18. The method of claim 17, further comprising applying a second pressure to the second end of the piston, wherein the second pressure is provided by fluids from a control line coupling an outlet of the flow control device to the regulatory valve.

19. The method of claim 18, wherein the first pressure and the second pressure are applied in the same direction.

20. The method of claim 19, further comprising applying a third pressure to the second end of the piston, wherein the third pressure is provided by fluids from an offset line, wherein the third pressure is applied in an opposing direction in relation to the first pressure and the second pressure.

* * * * *

UNITED STATES PATENT AND TRADEMARK OFFICE
CERTIFICATE OF CORRECTION

PATENT NO. : 11,041,361 B2  
APPLICATION NO. : 16/610077  
DATED : June 22, 2021  
INVENTOR(S) : Michael Linley Fripp, Stephen Michael Greci and Ibrahim El Mallawany Page 1 of 1

It is certified that error appears in the above-identified patent and that said Letters Patent is hereby corrected as shown below:

In the Claims

On Column 14 Line 16, Claim 17 please delete:
"fluids"
And replace with:
--fluid--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*